Nov. 14, 1939.   G. C. THOMAS, JR., ET AL   2,180,096
ENTRANCE FITTING
Filed Feb. 11, 1937
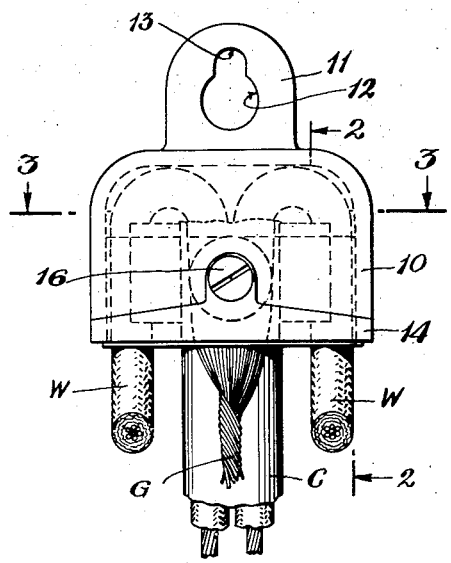
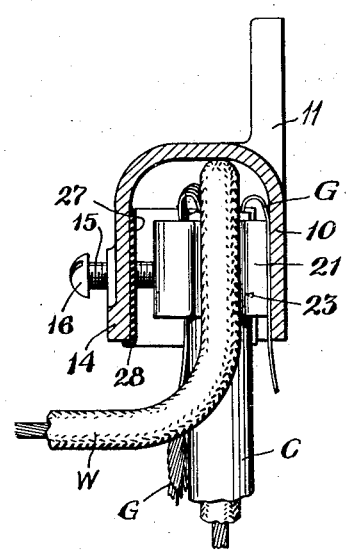
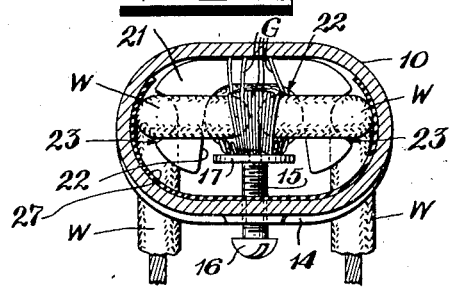
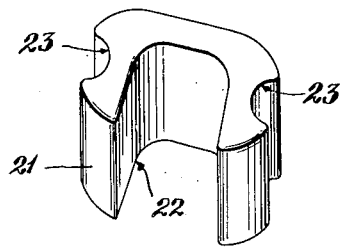
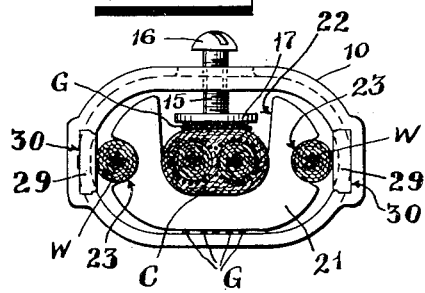
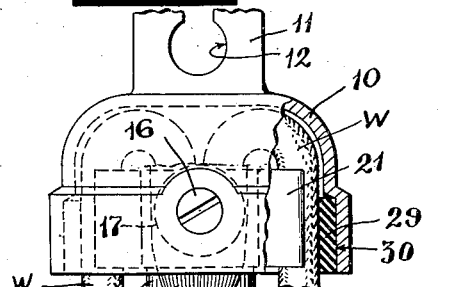
INVENTORS
George C. Thomas Jr.
Carroll A. Badeau
BY
Bohleber & Ledbetter
ATTORNEYS Patented Nov. 14, 1939

2,180,096

UNITED STATES PATENT OFFICE 2,180,096

ENTRANCE FITTING

George C. Thomas, Jr., Elizabeth, and Carroll A. Badeau, Highland Park, N. J., assignors to The Thomas & Betts Co., Elizabeth, N. J., a corporation of New Jersey Application February 11, 1937, Serial No. 125,236

13 Claims. (Cl. 174—81)

The invention relates to an entrance fitting which is used on the outside of a wall, such as the wall of a house or other structure, in order to support, at a substantial height above the ground, the electrical power wires extending from a pole to a building. The entrance fitting is attached to the wall, and the wires from the pole are generally electrically connected adjacent the fitting to a heavily insulated cable which extends along the side of the wall and enters the building or structure at or adjacent the ground level. This entrance fitting is grounded and the manner in which it is grounded will be described hereinafter.

An object of the invention is to construct a new and novel entrance fitting which is easily assembled and mounted upon the wall of a bulding or other structure and comprises a minimum number of parts.

Another object of the invention is to devise an entrance fitting having a hood member and an insulating member which is received within the hood member and over which the wire or wires of a cable are bent. An operating means clamps the cable and the insulating member within the hood member.

It is another object of the invention to construct an entrance fitting having an outer or hood member, preferably of metal, and an insulating member which is received within the hood member and carries a passage for the cable and preferably at least one passage for the wires within the cable. Operating means, which is preferably a single operating screw, then serves the three functions of clamping the insulating member within the hood, clamping the cable in the cable passage in the insulating member, and grounding the hood.

Another object is to devise an entrance fitting with a new and novel form of metallic member which does not have a separable cover.

Other objects of the invention will be more apparent from the following description taken in connection with the accompanying drawing, illustrating a preferred embodiment of the invention, in which:

Figure 1 is a front view of the entrance fitting with a cable clamped therein, and the wires of the cable are shown in dotted lines curving around over the top of an insulating member within the hood member and extending downwardly and then outwardly from beneath the lower edge of the hood member.

Figure 2 is a side view of the entrance fitting shown in Figure 1 with the hood member and an insulating sheet in section to expose the parts therein.

Figure 3 is a section, taken on line 3—3 of Figure 1, showing the operating screw clamping the insulating member within the hood and the cable within a cable passage of the insulating member and engaging grounding wires carried as a sheath by the cable by means of which the hood member is grounded.

Figure 4 is a perspective view of the insulating member which is received within the hood member, and shows a deep channel in one side thereof to receive the cable as well as a groove at each end thereof in which the individual wires in the cable are received and extend downwardly to project from beneath the hood member so that the wires may be electrically connected with the power wires coming from a pole.

Figure 5 is a bottom view of an entrance fitting gripping a cable to be inserted therein, and shows insulating inserts within and at each end of the hood member opposite the wire passages in the insulating member.

Figure 6 is a front view, partially in section, showing the insulating insert positioned in the hood.

The entrance fitting of the invention includes a hood or hood member 10 which is preferably made of metal. The hood member approximates the shape of an inverted cup and has an open bottom. Preferably, the cross-section of the hood is greater in one dimension than the other, or approximating an oval shape. A reenforcing flange 14 may be provided at the bottom of the hood member, if desired, which flange extends across the width of the hood member and also extends upwardly to provide greater wall thickness where a threaded hole 15 is provided for an operating means or screw 16.

The hood member 10 is provided with means 11 of any desired kind for receiving a supporting device of any desired form in order to secure and support the entrance fitting upon a wall. The means 11 illustrated is in the form of a lug extending upwardly from the hood member 10 and adjacent a side thereof. The lug is provided with a large hole 12 therethrough through which the head of a securing bolt or screw may pass, which hole is provided with a groove 13 at its upper circumference to receive the shank of the screw when the entrance fitting is secured to the wall.

An insulating member 21 is of such size that it will fit into the hood member 10 and provide an insulated spacer between the cable and the wire or wires which have been separated from the cable by removing the outer insulation and other cable structure. The wire W is bent over the insulating member so that the insulating member, or a part thereof, separates the cable and the wires, and each wire is directed downwardly so that it may be extended outwardly from beneath the lower edge of the hood member. The insulating member, in the form illustrated particularly in the drawing, has a cable passage therein extending upwardly from the bottom thereof. In the preferred form, the insulating member may be described as U-shaped in order to provide a central cable channel 22 in one side thereof. The insulating member 21 is shaped so that it will fit into the hood member 10, and also preferably has a length less than the inside height of the hood member.

The insulating member 21 is preferably provided with at least one wire passage 23 extending downwardly. In the best form of construction a wire passage is provided for each wire, which passage is a groove 23 in each edge or side of the insulating member. In the construction illustrated, where the cable channel 22 extends the length of the insulating member, the wire grooves also extend the length thereof. Each groove is adapted to receive one of the wires W carried by the cable C.

The operating means or screw 16 is threaded through the side of the hood or hood member 10 and preferably opposite from the channel 22 so that it will engage the cable positioned within the cable passage. The operating screw carries a wide washer or contact shoe on the end thereof to distribute the pressure of the operating screw 16 over a larger area of the cable and to provide a wide surface for engagement with grounding or sheath wires G, as will appear more fully hereinafter. Although the operating means 16 is shown as engaging the cable, it is to be understood that other arrangements of insulating member and cable are contemplated, and the primary purpose of the operating means is to clamp the insulating member 21 and the cable C between the operating means and the inside wall of the hood member 10.

The grounding sheath wires G of the cable are also preferably clamped in contact with either the operating means or the wall of the hood member, or with both. Since the sheath wires G of the cable are grounded, the contact of these wires with the operating means 16, or the wall of the hood member, also grounds the latter either directly or through the operating screw.

A second insulating member 27 is preferably provided between the open cable channel and the inside of the metallic hood member 10. This second insulating member is preferably a relatively thin and flexible sheet of insulating material, such as insulating paper 27, and extends partially around the inside of the hood 10. When the wire passages are grooves 23 in the ends of the insulating member, the insulating sheet 27 extends beyond the wire grooves in the insulating member 21 so as to cover the metallic wall of the hood member at the wires. The lower end of this insulating sheet 27 carries an outward curl 28 which provides a smooth rounded corner of insulating material for the lower edge of the hood member. This insulating sheet assures that the hood member is effectively insulated from wires W in case the insulation thereof should become abraded and expose the metallic wire, and the curl at the bottom of the insulating sheet prevents abrasion of the wire insulation upon the corner of the hood member 10.

There is shown in Figures 5 and 6 another form of entrance fitting construction which is essentially like that illustrated in Figures 1 through 4. In this construction, however, an insulating insert 29 is carried by the hood member 10 at a point opposite each wire passage 23. In the construction illustrated, in which a wire passage 23 is provided at each end of the insulating member 21, an insulating insert 29 is provided at each end of the hood member.

The insulating inserts 29 are received in a groove 30 carried on the inside of the hood member 21 and at the bottom of the hood member. This insulating insert 29 prevents abrasion of the wire W at the lower edge of the hood member and also provides insulation between the hood member and the wire W in case the insulation on the wire should become abraded so as to expose the metallic wire strands therein. In this construction the insulating member 21 preferably more accurately fits the inside chamber of the hood member so that the wire passages 23 and the wire W received therein are brought and retained opposite the insulating inserts 29. The inserts 29 are secured in the grooves 30 in any suitable manner.

The entrance fitting described is used in the following manner, and the description of its use also sets forth the method of grounding the entrance fitting. The cable C has the outer layer of insulation removed therefrom which exposes the sheathing wires G. These sheathing wires G are grounded at the other end of the cable. The wires W within the cable are then exposed and separated as individual wires. The sheathing wires are bent forwardly and downwardly and their ends twisted together so that they are generally consolidated along the front face of the cable. The cable C is then inserted in the channel 22 of the insulating member 21 and each wire is bent over the top thereof, as illustrated in Figure 1, and extended down its respective groove 23. The insulating member, with the cable in its channel and the wires in their respective grooves, is pressed into the hood 10 as far as it will go.

After the insulating member 21 is pressed into the hood member, the operating screw 16 is then tightened and engages the grounded sheath wires G and presses them against the cable C, at the same time the cable C is pressed against the bottom of the channel 22 in the insulating member 21, and the insulating member in turn is pressed against the back wall of the hood 10. It will be observed, therefore, that the operating screw clamps the sheath wires against the cable, the cable within the channel of the insulating member, and the insulating member within the hood so that all parts are securely anchored therein and the hood is grounded through the disk 17, operating screw, and the contact of this screw with the hood 10, or through the sheath wires directly in contact with the wall of the hood member.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawing.

What is claimed is:

1. An entrance fitting for a cable having one or more wires therein, comprising a hood member having the general shape of an inverted cup and provided with means adapted to be used to secure the entrance fitting to some other structure, an insulating member received within the hood member, the insulating member being adapted to have wires of a cable bent thereover to provide an insulating spacer between the wires and the cable and so that the wires may be directed downwardly and may project outwardly beneath the lower edge of the hood member, and operating means carried by the hood member and operable to clamp the cable and the insulating member between the operating means and the inner wall of the hood member.

2. An entrance fitting for a cable having one or more wires therein comprising a hood member having the general shape of an inverted cup and provided with means adapted to be used to secure the entrance fitting to some other structure, an insulating member received within the hood member and having a cable passage therein extending upwardly from the bottom thereof, the cable passage being adapted to receive a cable and the wires of the cable being adapted to be bent over the insulating member to provide an insulating spacer between the wire or wires and the cable and so that the wire or wires may be directed downwardly and may project outwardly beneath the lower edge of the hood member, and operating means carried by the hood member and operable to clamp the cable and the insulating member between the operating means and the inner wall of the hood member.

3. An entrance fitting for a cable having one or more wires therein comprising a hood member having the general shape of an inverted cup and provided with means adapted to be used to secure the entrance fitting to some other structure, an insulating member received within the hood member and having at least one downwardly extending wire passage, the wire or wires of a cable being adapted to be bent over the insulating member to provide an insulating spacer between the cable and the wire or wires, the wire passage adapted to lead the wire or wires downwardly so that they may project outwardly beneath the lower edge of the hood member, and operating means carried by the hood member and operable to clamp the cable and the insulating member between the operating means and the inner wall of the hood member.

4. An entrance fitting comprising a hood member having the general shape of an inverted cup and provided with means adapted to be used to secure the entrance fitting to some other structure, an insulating member received within the hood member and having a cable passage therein extending upwardly from the bottom thereof to receive a cable or the like, at least one downwardly extending wire passage carried by the insulating member to receive the individual wires of the cable and lead them downwardly so that the wires may project outwardly beneath the lower edge of the hood member, and operating means carried by the hood member and operable to engage the cable to clamp the same in the cable passage and in turn to clamp the insulating member in the hood member.

5. An entrance fitting comprising a hood member having the general shape of an inverted cup and provided with means adapted to be used to secure the member to some other structure, an insulating member received within the hood member and having a channel in the side thereof extending the length thereof to receive a cable or the like, at least one downwardly extending wire passage provided in the insulating member to receive the individual wires of the cable and lead them downwardly so that the wires may project outwardly beneath the lower edge of the hood member, and operating means carried by the hood member and operable to engage the cable to clamp the same in the channel and in turn to clamp the insulating member in the hood member.

6. An entrance fitting comprising a hood member having the general shape of an inverted cup and provided with means adapted to be used to secure the member to some other structure, an insulating member received within the hood member and shorter than the inside depth of the hood member, the insulating member having a channel in one side thereof and extending the length thereof to receive a cable or the like, a wire groove carried by the insulating member at each end thereof and extending the length thereof so that the individual wires of the cable may be bent over the end of the insulating member and led downwardly so that they project from beneath the lower edge of the hood member, and operating means carried by the hood member and operable to enter the channel and engage the cable to clamp the same in the channel and in turn to clamp the insulating member in the hood member.

7. An entrance fitting comprising a hood member having the general shape of an inverted cup and provided with means adapted to be used to secure the member to some other structure, an insulating member received within the hood member and having a channel in the side thereof extending the length thereof to receive a cable or the like, at least one downwardly extending wire passage carried by the insulating member to receive the individual wires of the cable and lead them downwardly so that the wires may project outwardly beneath the lower edge of the hood member, a second insulating member located between the channel and the hood member, and operating means carried by the hood member and extending through the second insulating member and operable to engage the cable to clamp the same in the channel and in turn to clamp the insulating member in the hood member.

8. An entrance fitting comprising a hood member having the general shape of an inverted cup and provided with means adapted to be used to secure the member to some other structure, an insulating member received within the hood member and shorter than the inside depth of the hood member, the insulating member having a channel in one side thereof and extending the length thereof to reecive a cable or the like, a wire groove carried by the insulating member at each end thereof and extending the length thereof so that the individual wires of the cable may be bent over the end of the insulating member and led downwardly so that they project from beneath the lower edge of the hood member, a flexible insulating sheet located between the channel and the hood member and extending around the inside of the hood beyond the wire grooves, and operating means carried by the hood member and extending through the flexible insulating sheet and operable to engage the cable to clamp the same in the channel and to clamp the insulating member in the hood member.

9. An entrance fitting comprising a hood member having the general shape of an inverted cup and provided with means adapted to be used to secure the entrance fitting to some other structure, an insulating member received within the hood member against which a cable is adapted to be clamped, a downwardly extending wire passage carried by the insulating member at each end thereof to receive the individual wires of the cable and lead them downwardly so that the wires may project outwardly beneath the lower edge of the hood member, operating means carried by the hood member and operable to engage the cable to clamp the same against the insulating member and in turn to clamp the insulating member in the hood member, and an insulating pad carried by the hood member opposite each wire passage in the insulating member and adjacent the bottom of the hood member to protect the wire against abrasion and short circuiting.

10. An entrance fitting comprising a hood member having the general shape of an inverted cup and provided with means adapted to be used to secure the entrance fitting to some other structure, an insulating member received within the hood member and having a cable passage therein extending upwardly from the bottom thereof to receive a cable or the like, at least one downwardly extending wire passage carried by the insulating member to receive the individual wires of the cable and lead them downwardly so that the wires may project outwardly beneath the lower edge of the hood member, operating means carried by the hood member and operable to engage the cable to clamp the same in the cable passage and in turn to clamp the insulating member in the hood member, and an insulating pad carried by the hood member opposite each wire passage in the insulating member and adjacent the bottom of the hood member to protect the wire against abrasion and short circuiting.

11. An entrance fitting comprising a hood member having the general shape of an inverted cup and provided with means adapted to be used to secure the entrance fitting to some other structure, an insulating member received within the hood member and having a cable passage therein extending upwardly from the bottom thereof to receive a cable or the like, a downwardly extending wire passage carried by the insulating member at each end thereof to receive the individual wires of the cable and lead them downwardly so that the wires may project outwardly beneath the lower edge of the hood member, operating means carried by the hood member and operable to engage the cable to clamp the same in the cable passage and in turn to clamp the insulating member in the hood member, and an insulating pad carried upon opposite ends of the hood member upon the inside thereof and opposite each wire passage in the insulating member and adjacent the bottom of the hood member to protect the wire against abrasion and short circuiting.

12. An entrance fitting and cable assembly comprising a cable having grounding sheath wires therein which are exposed and bent through 180 degrees so that they lie along the side of the cable, a metallic hood member provided with means adapted to be used to secure the entrance fitting to some other structure, an insulating member received within the housing member, and operating means carried by the housing member, the cable being positioned between the insulating member and the operating means so that tightening of the operating means brings the latter into engagement with the grounding sheath wires and cable to clamp the latter against the insulating member, to clamp the insulating member against the wall of the hood member and to ground the hood member through the grounding sheath wires and operating means.

13. An entrance fitting and cable assembly comprising a cable having grounding sheath wires therein which are exposed and bent through 180 degrees so that they lie along the side of the cable, a metallic hood member provided with means adapted to be used to secure the entrance fitting to some other structure, an insulating member received within the housing member and having a channel in the side thereof to receive the cable, at least one downwardly extending wire passage carried by the insulating member to receive the individual wires of the cable and lead them downwardly so that the wires may project outwardly beneath the lower edge of the hood member, and operating means carried by the hood member and operable to engage the grounding sheath wires and cable to clamp the latter in the channel of the insulating member, to clamp the insulating member in the hood member and to ground the housing member through the grounding sheath wires and operating means.

GEORGE C. THOMAS, Jr.
CARROLL A. BADEAU.